United States Patent
Arai et al.

(10) Patent No.: US 12,504,278 B2
(45) Date of Patent: Dec. 23, 2025

(54) SHAPE MEASURING DEVICE

(71) Applicant: Mitsubishi Electric Corporation, Tokyo (JP)

(72) Inventors: Yuya Arai, Tokyo (JP); Hiroyuki Kawano, Tokyo (JP); Keita Mochizuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 18/290,457

(22) PCT Filed: May 20, 2021

(86) PCT No.: PCT/JP2021/019128
§ 371 (c)(1),
(2) Date: Nov. 14, 2023

(87) PCT Pub. No.: WO2022/244175
PCT Pub. Date: Nov. 24, 2022

(65) Prior Publication Data
US 2024/0255278 A1 Aug. 1, 2024

(51) Int. Cl.
*G01B 11/25* (2006.01)

(52) U.S. Cl.
CPC ................. *G01B 11/2545* (2013.01)

(58) Field of Classification Search
CPC .. G01B 11/2545; G01B 11/2522; G01B 11/25
See application file for complete search history.

(56) References Cited

U.S. PATENT DOCUMENTS

| | | | |
|---|---|---|---|
| 7,876,455 B2 * | 1/2011 | Kawasaki | G01B 11/2513 356/602 |
| 2008/0170238 A1 | 7/2008 | Ochi et al. | |
| 2018/0308282 A1 * | 10/2018 | Yokoi | G06T 7/593 |
| 2020/0134860 A1 * | 4/2020 | Haven | G06T 7/0004 |
| 2020/0300616 A1 * | 9/2020 | Nishi | G06T 7/521 |

FOREIGN PATENT DOCUMENTS

| | | | |
|---|---|---|---|
| JP | H08-118023 A | 5/1996 | |
| JP | 2001-304827 A | 10/2001 | |
| JP | 2008-175625 A | 7/2008 | |
| JP | 2015-114235 A | 6/2015 | |
| JP | 2020-153718 A | 9/2020 | |
| WO | WO-2017064875 A1 * | 4/2017 | G01B 11/25 |

OTHER PUBLICATIONS

International Search Report and Written Opinion mailed on Jul. 13, 2021, received for PCT Application PCT/JP2021/019128, filed on May 20, 2021, 8 pages including English Translation.

* cited by examiner

*Primary Examiner* — Hung V Nguyen
(74) *Attorney, Agent, or Firm* — XSENSUS LLP

(57) ABSTRACT

A shape measuring device includes: a first light radiating unit to radiate first line light and second line light; a first image capturing unit to capture an object; and a measuring unit to measure a shape of the object on a basis of a first image and second images.

13 Claims, 6 Drawing Sheets

SHAPE MEASURING DEVICE

CROSS-REFERENCE TO RELATED APPLICATION

This application is based on PCT filing PCT/JP2021/019128, filed May 20, 2021, the entire contents of which are incorporated herein by reference.

TECHNICAL FIELD

The present disclosure relates to a shape measuring device.

BACKGROUND ART

Contact and non-contact measurement methods are known as methods for measuring a three-dimensional shape of an object. As a non-contact measurement method, the optical cutting method is widely used. In the light cutting method, for example, line light is radiated from a light radiating unit toward the object, and the image of the line light projected on the object is captured by the image capturing unit. In this case, a direction of a field of view of the image capturing unit is different from a radiation direction of the line light. In a shape measuring device employing the light cutting method, a position of the object is moved relative to an optical system including the light radiating unit and the image capturing unit, and thus the three-dimensional shape of the object is measured on the basis of the images that are sequentially obtained.

The resolving power of the shape measuring device is the value obtained by dividing the field of view of the image capturing unit by the number of pixels. For that reason, when a range of measurement in a direction along the height of the object is extended, the resolving power decreases. In order to prevent the resolving power from decreasing, a shape measuring device including two image capturing units is known. See, for example, Patent Reference 1.

PRIOR ART REFERENCE

Patent Reference

Patent Reference 1: Japanese Patent Application Publication No. 2015-114235

SUMMARY OF THE INVENTION

Problem to be Solved by the Invention

However, the configuration in Patent Reference 1 has a problem of high cost because the configuration includes two image capturing units. Also, in the configuration in Patent Reference 1, the amount of image data required for measurement processing increases, and thus there is also a problem in that a load on calculations increases. In addition, the configuration in Patent Reference 1 requires synchronous control to synchronize the images captured by the two image capturing units, and thus there is also a problem in that a device is complicated.

It is an object of the present disclosure to provide a shape measuring device that is simplified and can reduce a load on calculations at low cost.

Means of Solving the Problem

A shape measuring device according to an aspect of the present disclosure includes: a first light radiating unit to radiate first line light and second line light, the first line light being linear light, the second line light being linear light; a first image capturing unit having a first field of view, to capture an object passing through a first measurement region, and to capture the object passing through a second measurement region different from the first measurement region, the first measurement region being a region where a first plane through which the first line light passes and the first field of view intersect with each other, the second measurement region being a region where a second plane through which the second line light passes and the first field of view intersect with each other, the second measurement region being located on the first light radiating unit side from the first measurement region; and a measuring unit to measure a shape of the object on a basis of a first image that is an image of a part of the object passing through the first measurement region and second images that are images of parts of the object passing through the second measurement region, the part of the object passing through the first measurement region being irradiated with the first line light, the parts of the object passing through the second measurement region being irradiated with the second line light.

Effects of the Invention

According to the present disclosure, it is possible to provide the shape measuring device that is simplified and can reduce a load on calculations at low cost.

MODE FOR CARRYING OUT THE INVENTION

Shape measuring devices according to embodiments of the present disclosure will now be described below with reference to the attached drawings. The following embodiments are merely examples, and the embodiments may be combined as appropriate and each embodiment may be modified as appropriate.

The shape measuring devices according to the embodiments measure a three-dimensional shape of a measurement object (hereafter, also referred to as an "object") with the optical cutting method. In order to facilitate understanding of the description, the drawings show the coordinate axes of an XYZ orthogonal coordinate system. The X axis and the Y axis are coordinate axes parallel to a datum plane S on which the object is placed. The Y axis is a coordinate axis parallel to a scanning direction of the shape measuring device. The Z axis is a coordinate axis orthogonal to the X axis and the Y axis, and lies along a direction of the height of the measurement object from the datum plane S.

First Embodiment

Figure 1:
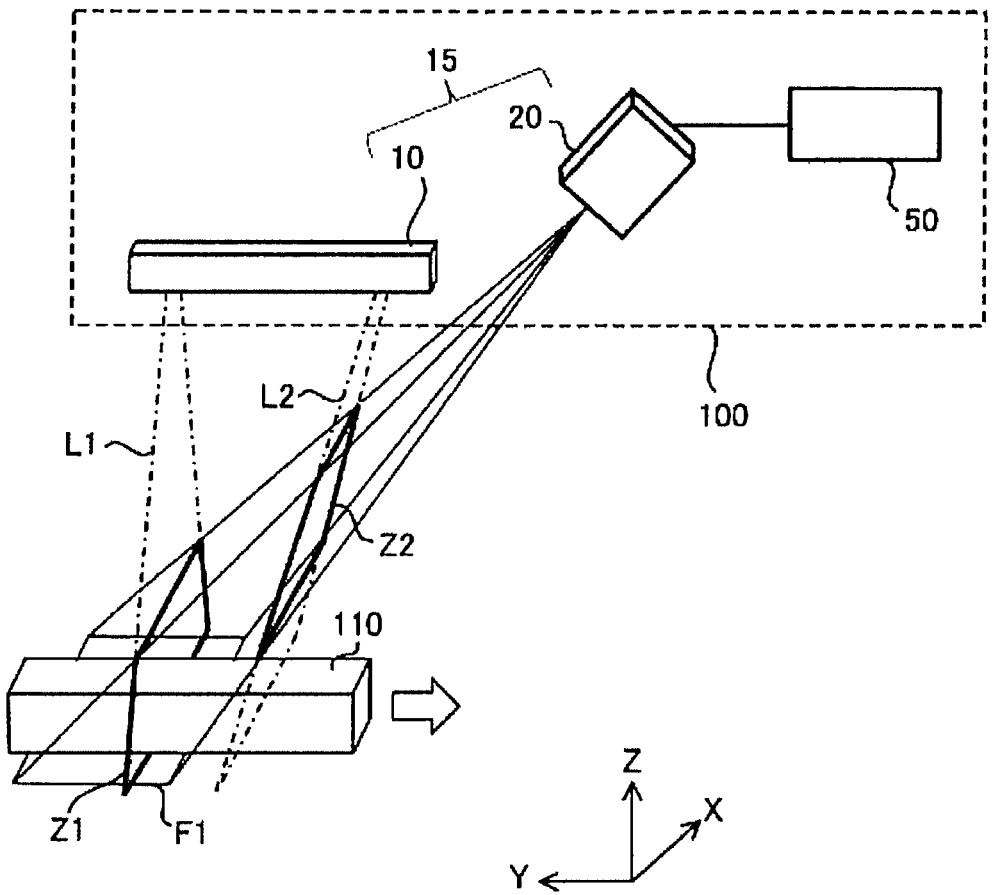
FIG. 1 is a perspective view showing a schematic structure of a shape measuring device according to a first embodiment and a first object.
Figure 2:
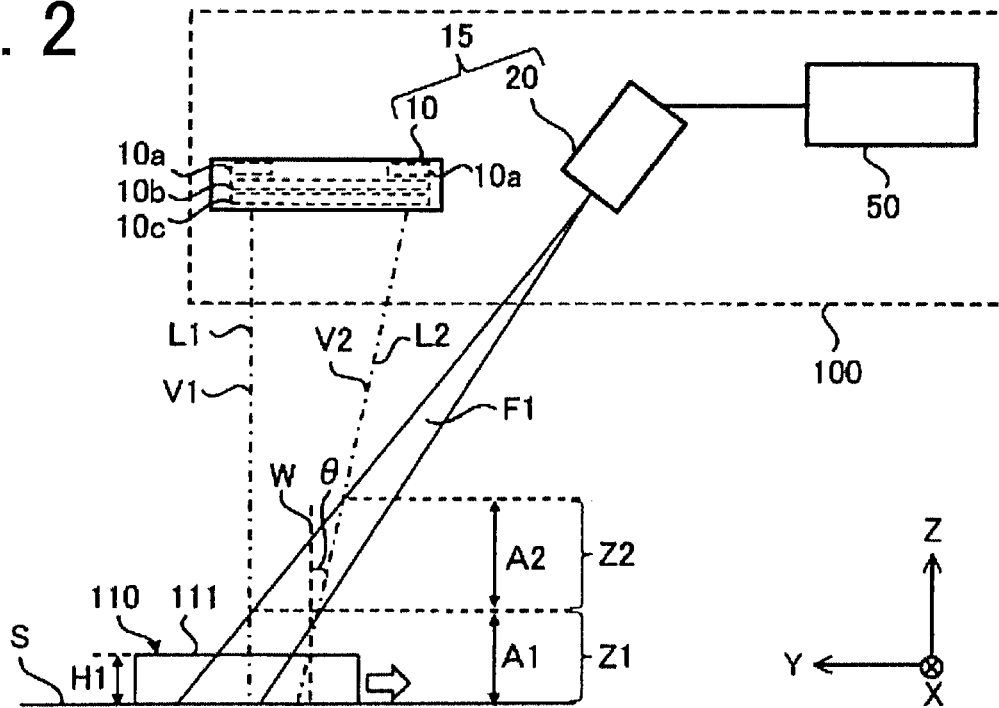
FIG. 2 is a diagram of the shape measuring device and the first object shown in FIG. 1 as seen in an X-axis direction.

FIG. 1 is a perspective view showing a schematic structure of a shape measuring device 100 according to a first embodiment and a first object 110. FIG. 2 is a diagram of the shape measuring device 100 and the first object 110 shown in FIG. 1 as seen in an X-axis direction. The first object 110 (hereafter, also referred to as an "object 110") is an example of the measurement object.

The shape measuring device 100 includes a light radiating unit 10 (hereafter, also referred to as a "first light radiating unit 10"), an image capturing unit 20 (hereafter, also referred to as a "first image capturing unit 20"), and a measuring unit 50.

The light radiating unit 10 radiates first line light L1 that is linear light and second line light L2 that is linear light. In such a manner, the light radiating unit 10 radiates two beams of line light. The first line light L1 and the second line light L2 are light that spreads in the X-axis direction. The first line light L1 and the second line light L2 are projected on a surface of the first object 110. Each shape of an image (pattern) of the first line light L1 and the second line light L2 is a linear form extending in the X-axis direction. It should be noted that the light radiating unit 10 may radiate three beams of light or more.

The second line light L2 is projected from a position away from the first line light L1 in a Y-axis direction that is a predetermined scanning direction. The second line light L2 is parallel to the first line light L1 in the X-axis direction. It should be noted that the second line light L2 is not necessarily parallel to the first line light L1 in only the X-axis direction and has only to be parallel to the first line light L1 in predetermined one direction. Also, a light radiating unit that radiates the first line light L1 and a light radiating unit that radiates the second line light L2 may be separate units. In addition, a wavelength of the first line light L1 may be different from a wavelength of the second line light L2, and intensity of the first line light L1 may be different from intensity of the second line light L2.

As shown in FIG. 2, the light radiating unit 10 includes, for example, spot light sources 10a, a collimating lens 10b, a cylindrical lens 10c. The collimating lens 10b collimates light emitted from the spot light sources 10a. The cylindrical lens 10c converts a pattern of the light collimated by the collimating lens 10b to a linear form. Accordingly, the first line light L1 and the second line light L2 are formed.

The image capturing unit 20 is, for example, a camera including a complementary metal oxide semiconductor (CMOS) image sensor. The image capturing unit 20 has an field of view F1 (hereafter, also referred to as a "first field of view F1"). A direction of the field of view F1 is different from radiation directions of the first line light L1 and the second line light L2 radiated from the light radiating unit 10.

In an example shown in FIGS. 1 and 2, the image capturing unit 20 captures the first object 110 passing through a first measurement region Z1. The first measurement region Z1 is a region where the first line light L1 and the field of view F1 intersect with each other. Specifically, the first measurement region Z1 is a region where a first plane V1 through which the first line light L1 passes and the field of view F1 intersect with each other. The first plane V1 is an imaginary X-Z plane. A height H1 of the first object 110 from the datum plane S is within the first measurement region Z1. It should be noted that the first line light L1 and the second line light L2 are radiated along the X-Z plane, but the first line light L1 and the second line light L2 are sometimes not parallel to the X-Z plane depending on an angle of incidence. For that reason, each of a second plane V2, which is described later, through which the second line light L2 passes and the first plane V1 is referred to as the "imaginary X-Z plane."

The image capturing unit 20 obtains an image of a part, which is irradiated with the first line light L1, of the first object 110 passing through the first measurement region Z1. A part, which is irradiated with the first line light L1, of the first object 110 is, for example, a surface 111 (hereafter, also referred to as a "top surface") facing in the +Z-axis direction of surfaces of the first object 110.

Figure 5A:
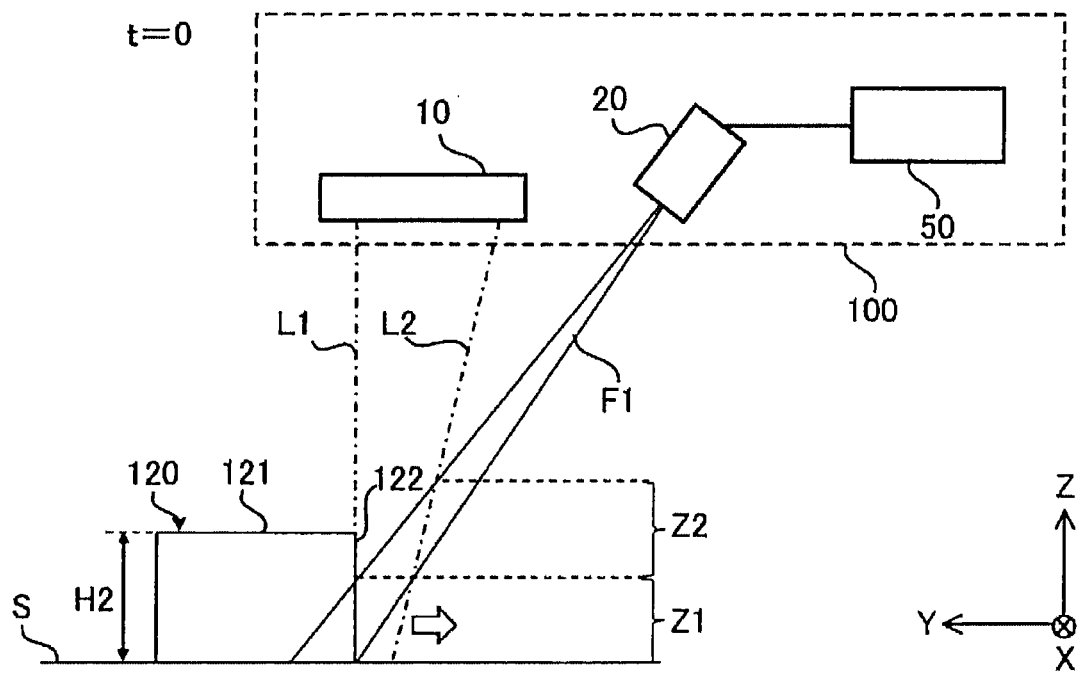
FIG. 5A is a diagram of the shape measuring device according to the first embodiment and a second object at a point in time of a start of measurement as seen in the X-axis direction.
Figure 5B:
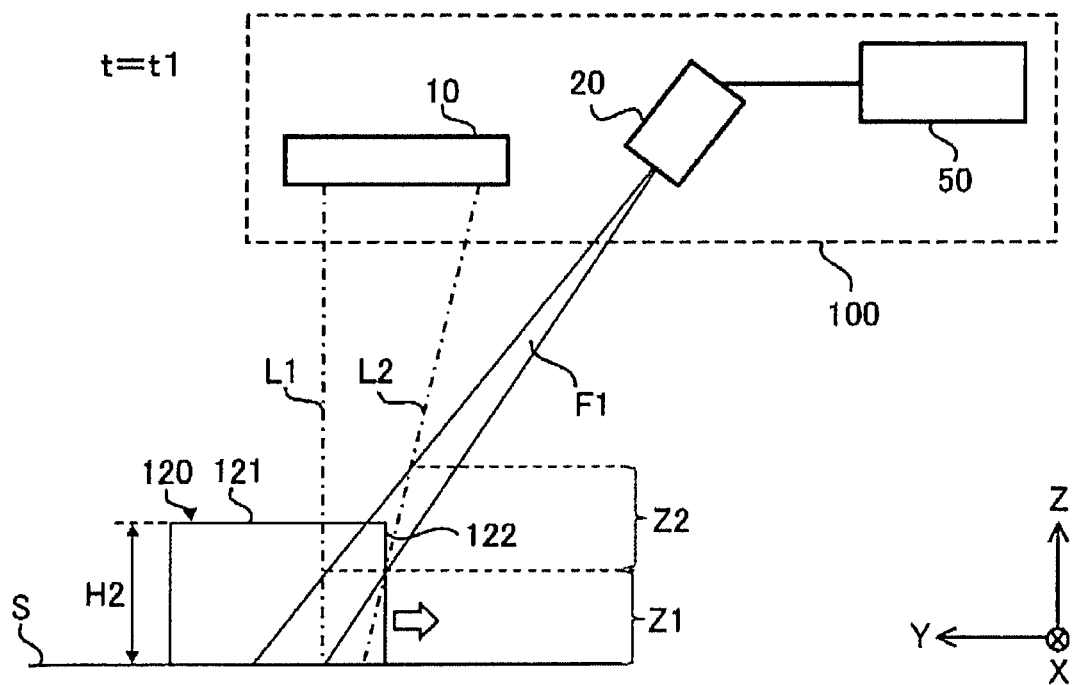
FIG. 5B is a diagram of the shape measuring device according to the first embodiment and the second object passing through a second measurement region after the start of the measurement as seen in the X-axis direction.

Also, as shown in FIGS. 5A and 5B referenced later, the image capturing unit 20 captures a second object 120 passing through a second measurement region 22 that is different from the first measurement region Z1. The second measurement region Z2 is a region where the second line light L2 and the field of view F1 intersect with each other. Specifically, the second measurement region Z2 is a region where a second plane V2 through which the second line light L2 passes and the field of view F1 intersect with each other. The second plane V2 is an imaginary X-Z plane.

The second measurement region Z2 is located on the light radiating unit 10 side (i.e., +Z axis side) from the first measurement region Z1. In the first embodiment, the second measurement region Z2 is located next to the first measurement region 21 in the Z-axis direction. In addition, the second measurement region Z2 does not overlap with the first measurement region Z1 in the Z-axis direction. It should be noted that a part of the second measurement region Z2 may overlap with the first measurement region Z1 so long as most of the second measurement region 22 does not overlap with the first measurement region Z1. That is, the second measurement region Z2 has only to include a region that does not overlap with the first measurement region Z1.

In the first embodiment, an angle of incidence (e.g., angle θ shown in FIG. 2) made by the second line light L2 to a normal W perpendicular to a datum plane S is different from an angle of incidence made by the first line light L1. This makes it possible to serve the second measurement region Z2 as a region that is different from the first measurement region Z1. In the first embodiment, the first line light L1 is incident on the object along the normal W. Therefore, the angle of incidence made by the first line light L1 incident on the object is zero degrees. In contrast to this, the angle of incidence made by the second line light L2 incident on the object is an angle θ that is larger than zero degrees. It should be noted that the angle of incidence made by the second line light L2 may be the same as the angle of incidence made by the first line light L1. That is, the second angle of incidence that is the angle of incidence made by the second line light L2 has only to be equal to or larger than the first angle of incidence that is the angle of incidence made by the first line light L1.

In addition, it is possible to serve the second measurement region Z2 as a region that is different from the first measurement region Z1 by adjusting a position of the image capturing unit 20 and an optical axis angle of the image capturing unit 20.

Figure 7:
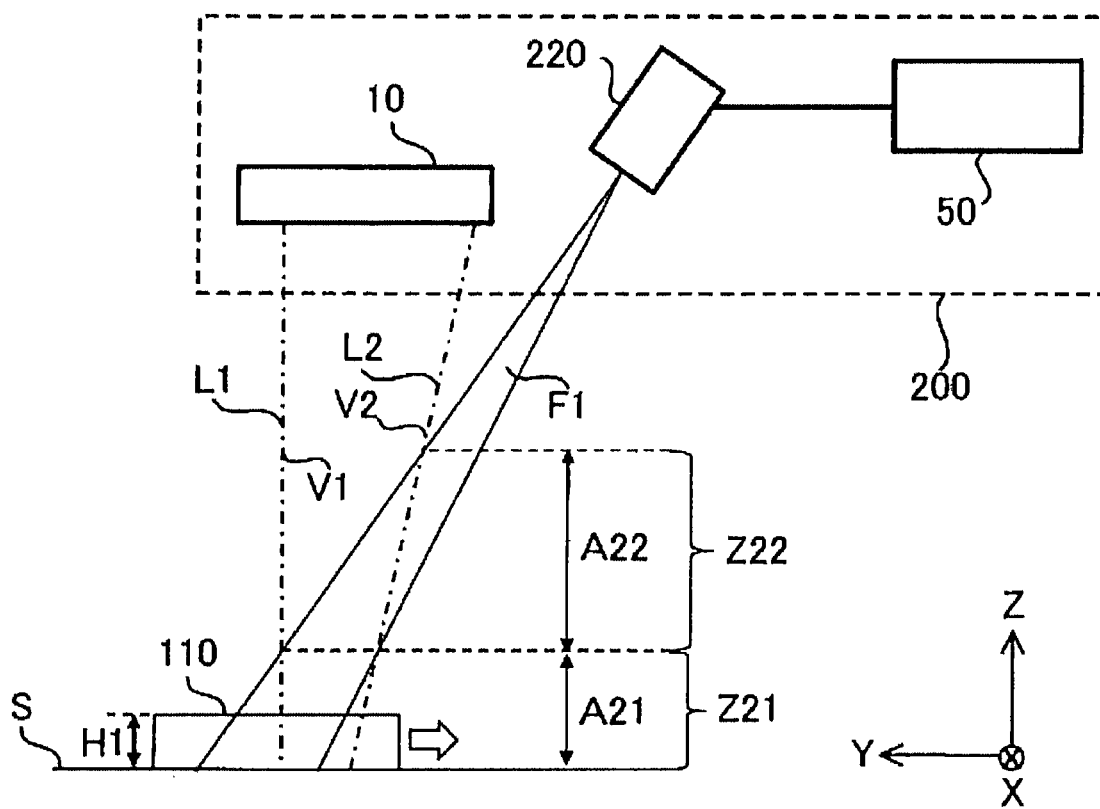
FIG. 7 is a diagram of a shape measuring device according to a second embodiment and an object as seen in the X-axis direction.

Also, in the first embodiment, a length A2 of the second measurement region Z2 in the Z-axis direction is the same as a length A1 of the first measurement region Z1 in the Z-axis direction. It should be noted that the length A1 of the first measurement region Z1 in the Z-axis direction may be shorter than the length A2 of the second measurement region Z2 in the Z-axis direction as shown in FIG. 7 referenced later. That is, the length A1 of the first measurement region Z1 has only to be equal to or shorter than the length A2 of the second measurement region Z2.

The shape measuring device 100 further includes a moving unit (not shown) that move (carry) the object in the scanning direction (−Y-axis direction in the first embodiment). It should be noted that the moving unit may move an optical system 15 including the light radiating unit 10 and the image capturing unit 20 in the scanning direction with the object stationary. That is, in the first embodiment, the optical system 15 and the object move in the Y-axis direction relatively with each other. Accordingly, images including an image of line light projected on the object are captured by the image capturing unit 20 one by one.

The measuring unit 50 measures a shape of the object on the basis of the image obtained by the image capturing unit 20. The measuring unit 50 is, for example, a central processing unit (CPU) including a memory. The measuring unit 50 calculates data indicating information as to the height of the object on the basis of the image obtained by the image capturing unit 20. For example, in the case where the object is the first object 110 having the height H1, the measuring unit 50 calculates the height H1 of the first object 110 on the basis of an image of a part, which is irradiated with the first line light L1, of the first object 110 passing through the first measurement region Z1.

When the measuring unit 50 calculates the height of the object, the measuring unit 50 needs to determine whether an image of the line light projected on the object is an image of the first line light L1 or an image of the second line light L2. A method for determining with the measuring unit 50 will now be described below. First, with reference to FIG. 3, FIG. 4A, and FIG. 4B, an image captured by the image capturing unit 20 when the first object 110 passes through the first measurement region Z1 will now be described.

Figure 3:
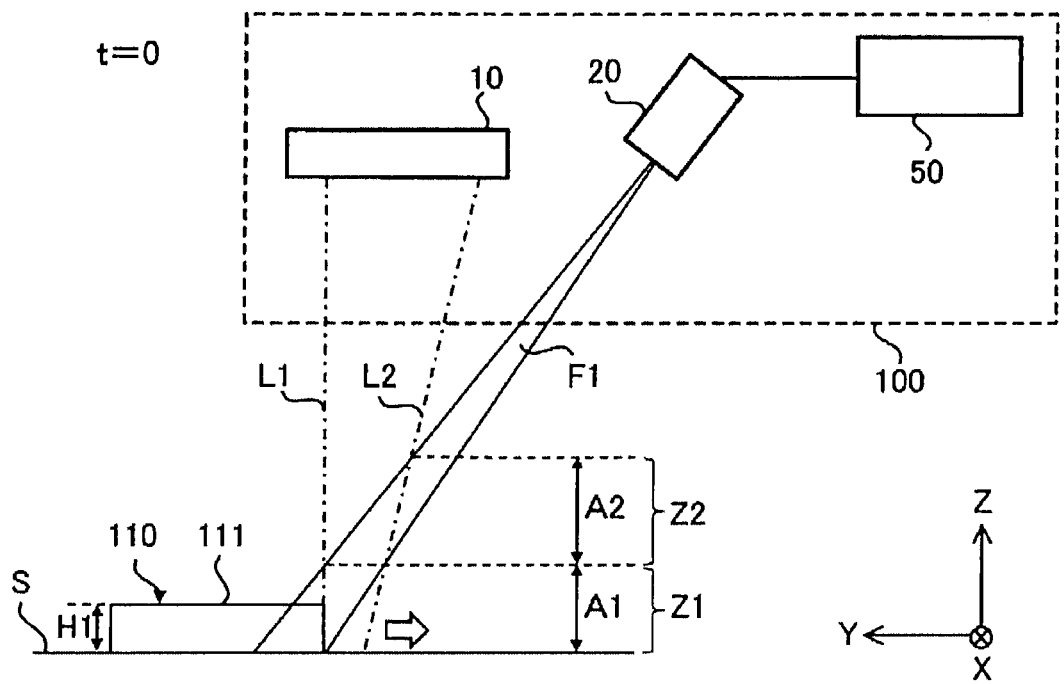
FIG. 3 is a diagram of the shape measuring device according to the first embodiment and the first object at a point in time of a start of measurement as seen in the X-axis direction.

FIG. 3 is a diagram of the shape measuring device 100 and the first object 110 at a point in time of a start of measurement as seen in the X-axis direction. An end part on a −Y axis side of the top surface 111 of the first object 110 is irradiated with the first line light L1 at the point in time of the start of measuring the first object 110. In the following description, let be time t=0 the point in time of the start of the measurement. After the start of the measurement, the first object 110 moves in the −Y-axis direction, and thus the image capturing unit 20 obtains an image including an image of the first line light L1 projected on the top surface 111 of the first object 110.

Figure 4A:
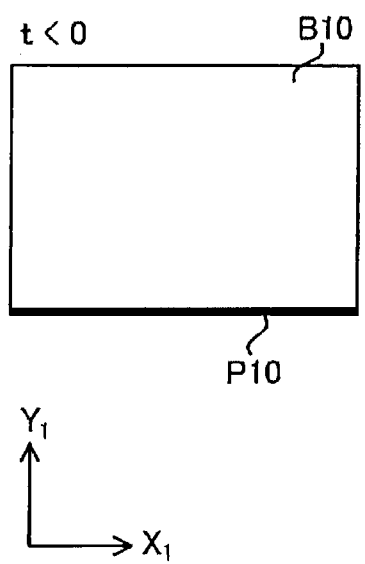
FIGS. 4A and 4B are diagrams showing an example of a transition of an image captured by an image capturing unit shown in FIGS. 1 to 3 when the first object passes through a first measurement region.
Figure 4B:
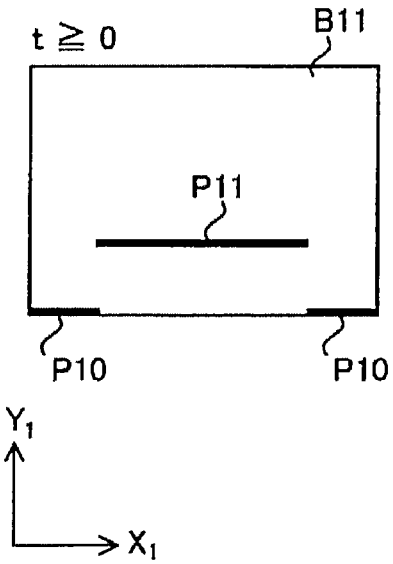

FIGS. 4A and 4B are diagrams showing an example of a transition of an image captured by the image capturing unit 20 shown in FIGS. 1 to 3 when the shape measuring device 100 measures the shape of the first object 110. In order to facilitate the explanation of the images shown in FIG. 4A, FIG. 4B, and FIG. 6A to FIG. 6D referenced later, a $Y_1$ axis that is a coordinate axis showing the height of the object and a $X_1$ axis that is another coordinate axis perpendicular to the $Y_1$ axis are used in the images.

FIG. 4A is a schematic diagram showing an example of an image B10 obtained when the time t<0. When the time t<0, the first object 110 is not irradiated with the first line light L1 and the datum plane S is irradiated with the first line light L1. Therefore, an image P10 of the first line light L1 projected on the datum plane S is shown in the image B10. When the time t<0, the datum plane S is irradiated with also the second line light L2, but an image of the second line light L2 is not included in the field of view F1. Therefore, the image of the second line light L2 is not shown in the image B10.

FIG. 4B is a schematic diagram showing an example of an image B11 obtained when the time t≥0. When the time t≥0, the datum plane S and the top surface 111 of the first object 110 are irradiated with the first line light L1. Therefore, in addition to the image P10, an image P11 of the first line light L1 projected on the top surface 111 is shown in the image B11. A position of the image P11 in the $Y_1$ axis direction in the image B11 corresponds to the height H1 of the first object 110. A distance between the image P10 and the image P11 in the $Y_1$ axis direction is the same as the height H1.

When the time t≥0, the datum plane S and the first object 110 are irradiated with the second line light L2, but the image of the second line light L2 is not included in the field of view F1. Therefore, the image of the second line light L2 is not shown in the image B11.

Next, images obtained by the image capturing unit 20 when the second object 120 that is higher than the first object 110 passes through the first measurement region Z1 and the second measurement region 22 will now be described with reference to FIG. 5A, FIG. 5B, and FIGS. 6A to 6D. FIG. 5A is a diagram of the shape measuring device 100 according to the first embodiment and the second object 120 at a point in time of a start of measurement (i.e., time t=0) as seen in the X-axis direction. The second object 120 also moves in the −Y-axis direction as much as the first object 110.

As shown in FIG. 5A, a height H2 of the second object 120 from the datum plane S is within the first measurement region Z1 and the second measurement region Z2. The image capturing unit 20 obtains an image of a part, which is irradiated with the first line light L1 and the second line light L2, of the second object 120 when the second object 120 moves in the −Y-axis direction. A part, which is irradiated with the first line light L1, of the second object 120 is a top surface 121 of the second object 120. Also, parts, which are irradiated with the second line light L2, of the second object 120 is the top surface 121 and a side surface 122 of the second object 120. An end part on a −Y axis side of the top surface 121 of the second object 120 is irradiated with the first line light L1 at the point in time of the start of measuring the second object 120.

FIG. 5B is a diagram of the shape measuring device 100 according to the first embodiment and the second object 120 passing through the second measurement region Z2 after the start of the measurement as seen in the X-axis direction. In FIG. 5B, the side surface 122 of the second object 120 is irradiated with the second line light L2. In the following description, let be time t1 the time at which the side surface 122 of the second object 120 is irradiated with the second line light L2. As time advances from the time t1, a part, which is irradiated with the second line light L2, of the second object 120 is shifted from the side surface 122 to the top surface 121. It should be noted that as long as parameters such as the angle of incidence made by the first line light L1, the angle of incidence made by the second line light L2, the position of the image capturing unit 20, and the moving speed of the second object 120 are not changed, the time t1 is fixed regardless of the height H2 when the height H2 of the second object 120 is within the second measurement region Z2.

Figure 6A:
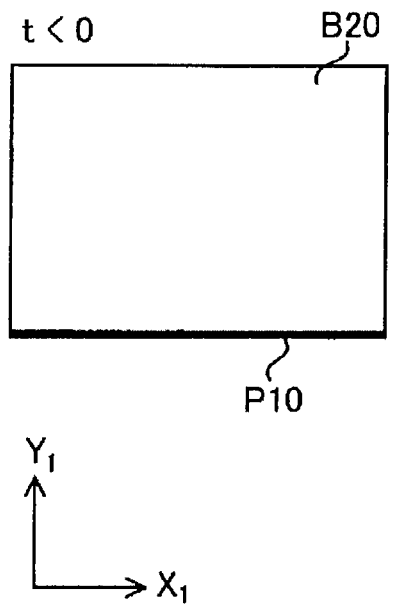
FIGS. 6A to 6D are diagrams showing an example of a transition of an image captured by the image capturing unit shown in FIGS. 5A and 5B when the second object passes through the second measurement region.

FIGS. 6A to 6D are diagrams showing an example of a transition of an image captured by the image capturing unit 20 shown in FIGS. 5A and 5B when the shape measuring device 100 measures a shape of the second object 120. FIG. 6A is a schematic diagram showing an example of an image B20 obtained when the time t<0. When the time t<0, the second object 120 is not irradiated with the first line light L1 and the datum plane S is irradiated with the first line light L1. Therefore, the image P10 of the first line light L1 projected on the datum plane S is shown in the image B20. When the time t<0, the datum plane S is irradiated with also the second line light L2, but the image of the second line light L2 is not included in the field of view F1. Therefore, the image of the second line light L2 is not shown in the image B20.

Figure 6B:
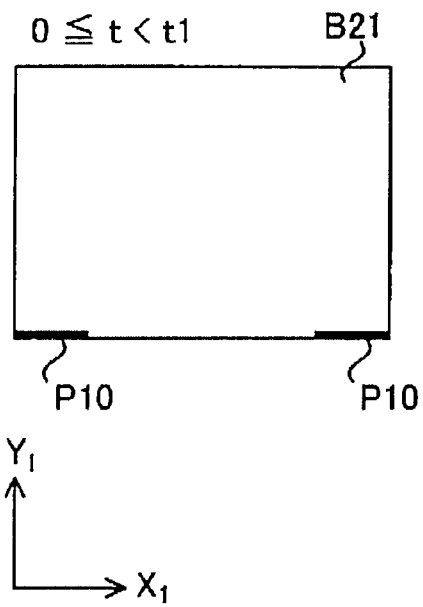

FIG. 6B is a schematic diagram showing an example of an image B21 obtained after the start of the measurement before the time t1 has passed. When the time 0≤t<t1, the datum plane S and the top surface 121 are irradiated with the first line light L1. An image of the first line light L1 projected on the top surface 121 is not included in the field of view F1. Therefore, the image of the first line light L1 projected on the top surface 121 of the second object 120 is not shown in the image B21, and images P10 of the first line light L1 projected on the datum plane S are shown in the image B21.

Figure 6C:
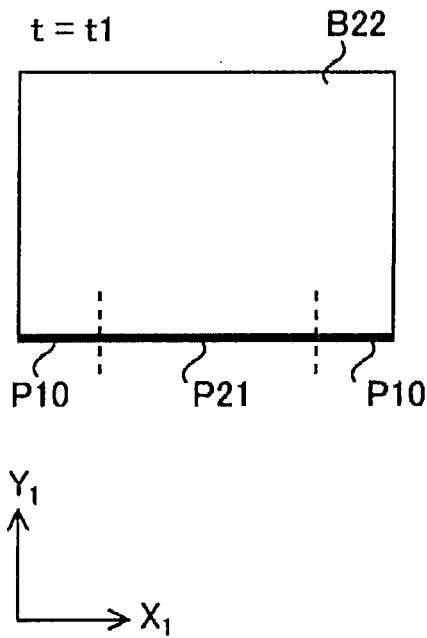

FIG. 6C is a schematic diagram showing an example of an image B22 captured when the time t=t1. As shown in FIG. 5B referenced above, at the time t=t1, the datum plane S and the top surface 121 are irradiated with the first line light L1 and the side surface 122 of the second object 120 is irradiated with the second line light L2. At also the time t=t1, the image of the first line light L1 projected on the top surface 121 is not included in the field of view F1. Therefore, the image P10 of the first line light L1 projected on the datum plane S and the image P21 of the second line light L2 projected on the side surface 122 are shown in the image B22. The images P10 and P21 are shown in an end part on a −Y axis side of the image B22.

Figure 6D:
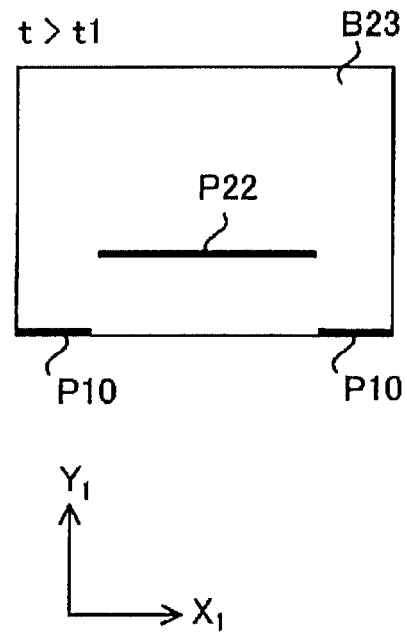

FIG. 6D is a schematic diagram showing an example of an image B23 obtained after the time t1 has passed. When the time t>t1, the datum plane S and the top surface 121 are irradiated with the first line light L1. In addition, when the time t>t1, the top surface 121 is irradiated with the second line light L2 after the side surface 122 is irradiated with the second line light L2 for a set time. When also the time t>t1, the image of the first line light L1 projected on the top surface 121 is not included in the field of view F1. Therefore, in addition to the image P10 of the first line light L1 projected on the datum plane S, an image P22 of the second line light L2 projected on the top surface 121 or the side surface 122 is shown in the image B23.

As described above, the image B11 is obtained as a first image including the image P11 of the first line light L1 when the first object 110 passes through the first measurement region Z1. Also, the image B22 and the image B23 are obtained as second images including the images P21 and P22 respectively of the second line light L2 when the second object 120 passes through the first measurement region 21 and the second measurement region Z2. That is, the image of the line light included in the image obtained by the image capturing unit 20 is different depending on the height of the object.

Also, the transition of the image obtained by the image capturing unit 20 is different in comparison with the case in which the first object 110 passes through the first measurement region Z1 when the second object 120 passes through the first measurement region 21 and the second measurement region Z2. To be specific, the image B20, the image B21, the image B22, and the image B23 are captured in this order when the second object 120 passes through the first measurement region Z1 and the second measurement region Z2. Also, the image B10 and the image B11 are captured in this order when the first object 110 passes through the first measurement region Z1.

In such a manner, the image of the line light included in the image obtained by the image capturing unit 20 and the transition of the image are different depending on the height of the object and consequently the measuring unit 50 is able to determine whether the image of the line light projected on the object is the image of the first line light L1 or the image of the second line light L2.

Advantages of First Embodiment

According to the first embodiment described above, the image capturing unit 20 of the shape measuring device 100 captures the first object 110 passes through the first measurement region Z1 and captures the second object 120 passes through the second measurement region Z2. The measuring unit 50 measures the shape of the first object 110 on the basis of the first image B11 of a part, which is irradiated with the first line light L1, of the first object 110. In addition, the measuring unit 50 measures the shape of the second object 120 on the basis of the second images B22 and B23 of parts, which are irradiated with the second line light L2, of the second object 120. Accordingly, with one image capturing unit 20, the shape measuring device 100 is able to extend a range of measurement in a direction along the height of the object and to measure the object with high accuracy. Therefore, it is possible to provide the shape measuring device 100 that extends the range of measurement at low cost and measures the object with high accuracy.

Also, according to the first embodiment, one image capturing unit 20 has a plurality of measurement regions (i.e., first measurement region Z1 and second measurement region Z2) depending on the height of the object. Accordingly, whether the shape of the object passing through the first measurement region Z1 is measured or the shape of the object passing through the second measurement region Z2 is measured, the number of pixels of an image on which arithmetic processing is performed by the measuring unit 50 is the same. Therefore, it is possible to reduce the load on calculations and speed up the calculation processing in the measuring unit 50.

Also, according to the first embodiment, synchronous control of images obtained by two image capturing units is not required in comparison with a configuration including the two image capturing units in a shape measuring device. Hence, it is possible to provide the simplified shape measuring device 100. Therefore, according to the first embodiment, it is possible to provide the shape measuring device 100 that is simplified and can reduce the load on calculations at low cost.

Second Embodiment

FIG. 7 is a diagram of a shape measuring device according to a second embodiment and the object 110 as seen in the X-axis direction. In FIG. 7, each component identical or corresponding to a component shown in FIG. 2 is assigned the same reference character as those in FIG. 2. The shape measuring device 200 according to the second embodiment is different from the shape measuring device 100 according to the first embodiment in that a length A22 of a second measurement region Z22 in the Z-axis direction is different from a length A21 of a first measurement region Z21 in the Z-axis direction. With respect to the other points, the shape measuring device 200 according to the second embodiment is the same as the shape measuring device 100 according to the first embodiment.

As shown in FIG. 7, the shape measuring device 200 includes the light radiating unit 10, an image capturing unit 220, and the measuring unit 50.

The image capturing unit 220 captures the first object 110 passing through the first measurement region Z21 and the second measurement region Z22. The first measurement region Z21 is a region where the first plane V1 through which the first line light L1 passes and the field of view F1 of the image capturing unit 220 intersect with each other. Also, the second measurement region Z22 is a region where the second plane V2 through which the second line light L2 passes and the field of view F1 of the image capturing unit 220 intersect with each other.

In the second embodiment, the length A22 of the second measurement region Z22 in the Z-axis direction is different from the length A21 of the first measurement region Z21 in the Z-axis direction. Accordingly, it is possible to vary resolving power in the second measurement region Z22 with respect to resolving power in the first measurement region Z21. In an example shown in FIG. 7, the length A21 is shorter than the length A22. The resolving power in each of the first measurement region Z21 and the second measurement region Z22 is the value obtained by dividing the field of view by the number of pixels. In the second embodiment, the number of pixels in the case in which the object 110 passing through the first measurement region Z21 is captured is the same as the number of pixels in the case in which the object 110 passing through the second measurement region Z22 is captured. For that reason, when the length A21 is shorter than the length A22, the value of the resolving power in the first measurement region Z21 is smaller than the value of the resolving power in the second measurement region Z22. This makes it possible to enhance the resolving power in the first measurement region Z21 with respect to the resolving power in the second measurement region Z22.

Adjusting at least one of the angle of incidence made by the first line light L1, the angle of incidence made by the second line light L2, a position of the image capturing unit 220, or an optical axis angle of the image capturing unit 220 can shorten the length A21 than the length A22. It should be noted that the length A22 may be shorter than the length A21. That is, either the length A21 or the length A22 has only to be shorter than the other. It should be noted that when the length A21 is different from the length A22, as in the second embodiment, a focal point of the image capturing unit 20 is preferable to be within the range of the measurement region having the shortest length in the Z-axis direction, of the first measurement region Z21 and the second measurement region Z22.

Advantages of Second Embodiment

According to the second embodiment described above, the length A22 of the second measurement region Z22 in the Z-axis direction is different from the length A21 of the first measurement region Z21 in the Z-axis direction. Accordingly, it is possible to vary the resolving power in the first measurement region Z21 with respect to the resolving power in the second measurement region Z22.

The length A21 of the first measurement region Z21 in the Z-axis direction is shorter than the length A22 of the second measurement region Z22 in the Z-axis direction. Accordingly, it is possible to enhance the resolving power in the first measurement region Z21 with respect to the resolving power in the second measurement region Z22.

Third Embodiment

Figure 8:
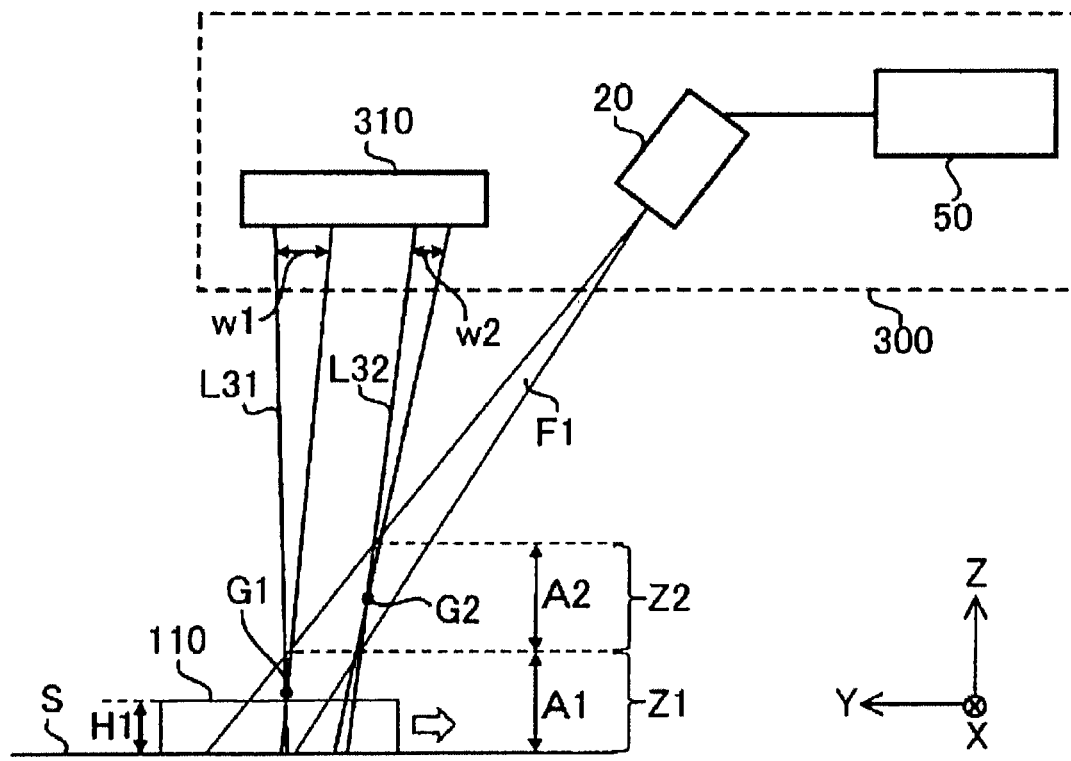
FIG. 8 is a diagram of a shape measuring device according to a third embodiment and an object as seen in the X-axis direction.

FIG. 8 is a diagram of a shape measuring device 300 according to a third embodiment and the object 110 as seen in the X-axis direction. In FIG. 8, each component identical or corresponding to a component shown in FIG. 2 is assigned the same reference character as those in FIG. 2. The shape measuring device 300 according to the third embodiment is different from the shape measuring device 100 according to the first embodiment in that a focal point G1 of a first line light L31 is within the range of the first measurement region Z1 and a focal point G2 of a second line light L32 is within the range of the second measurement region Z12. With respect to the other points, the shape measuring device 300 according to the third embodiment is the same as the shape measuring device 100 according to the first embodiment.

As shown in FIG. 8, the shape measuring device 300 includes a light radiating unit 310, the image capturing unit 20, and the measuring unit 50.

The light radiating unit 310 includes a collimating lens and a cylindrical lens (e.g., collimating lens 10b and cylindrical lens 10c shown in FIG. 2 referenced above). The arrangements of the collimating lens and the cylindrical lens are coordinated. The collimating lens collimates the light emitted from a spot light source. The cylindrical lens condenses a pattern of the light collimated by the collimating lens into a linear form. The light radiating unit 310 radiates the first line light L31 that is linear light and the second line light L32 that is linear light. Each of the first line light L31 and the second line light L32 spreads in the Y-axis direction. In an example shown in FIG. 8, a width of the first line light L31 in the Y-axis direction is expressed as w1, and a width of the second line light L32 in the Y-axis direction is expressed as w2.

In the third embodiment, the focal point G1 of the first line light L31, which is the position where the width w1 is the thinnest, is included within the first measurement region Z1. Accordingly, when the object 110 passes through the first measurement region Z1, the object 110 is irradiated with the condensed first line light L31. Therefore, the positional accuracy of the image of the first line light L31 projected on the object 110 is improved and consequently it is possible to improve the accuracy of calculating the height H1 of the object 110 in the measuring unit 50.

Also, the focal point G2 of the second line light L32, which is the position where the width w2 is the thinnest, is included within the second measurement region Z2. Accordingly, when the object passes through the second measurement region Z2, the object is irradiated with the condensed second line light L32. Therefore, the positional accuracy of the image of the second line light L32 projected on the object passing through the second measurement region Z2 is improved and consequently it is possible to improve the accuracy of calculating the height of the object in the measuring unit 50.

For example, by adjusting the position in the Z-axis direction of the collimating lens (not shown) included in the light radiating unit 310 to a predetermined position, the focal point G1 can be included in the first measurement region Z1 and the focal point G2 can be included in the second measurement region Z2.

Advantages of Third Embodiment

According to the third embodiment described above, the focal point G1 of the first line light L31 is included in the first measurement region Z1. Accordingly, when the object 110 passes through the first measurement region Z1, it is possible to improve the accuracy of calculating the height H1 of the object 110 in the measuring unit 50.

Also, according to third embodiment, the focal point G2 of the second line light L2 is included in the second measurement region Z2. Accordingly, when the object passes through the second measurement region Z2, it is possible to improve the accuracy of calculating the height of the object in the measuring unit 50.

Fourth Embodiment

Figure 9:
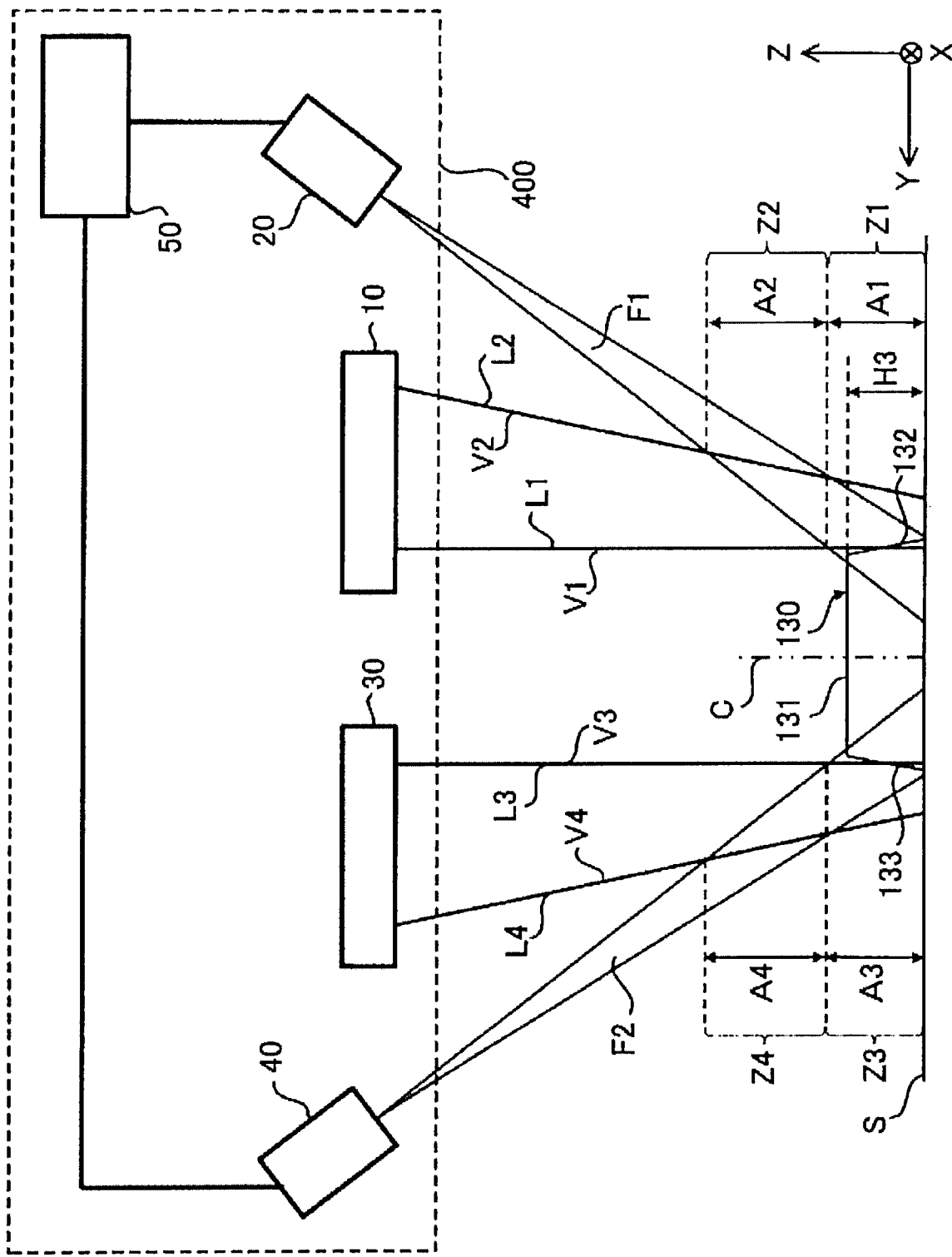
FIG. 9 is a diagram of a shape measuring device according to a fourth embodiment and an object as seen in the X-axis direction.

FIG. 9 is a diagram of a shape measuring device 400 according to a fourth embodiment and an object 130 as seen in the X-axis direction. In FIG. 9, each component identical or corresponding to a component shown in FIG. 2 is assigned the same reference character as those in FIG. 2. The shape measuring device 400 according to the fourth embodiment is different from the shape measuring device 100 according to the first embodiment in that the shape measuring device 400 further includes a second light radiating unit 30 and a second image capturing unit 40. With respect to the other points, the shape measuring device 400 according to the fourth embodiment is the same as the shape measuring device 100 according to the first embodiment.

The object 130 shown in FIG. 9 is an example of an object to be measured. The shape of the object 130 is different from the shape of each of the first object 110 and the second object 120 of the first embodiment. In an example shown in FIG. 9, the shape of the object 130 as seen in the X-axis direction is a trapezoid. In other words, in the fourth embodiment, side surfaces 132 and 133 facing in the Y-axis direction of the object 130 are inclined surfaces. When the shape measuring device 100 (see, for example, FIG. 1 and FIG. 2) according to the first embodiment measures the shape of the object 130, the first image capturing unit 20 is able to capture a pattern of line light projected on the side surface 132 facing in the −Y-axis direction. However, depending on the degree of the incline of the side surface 133 facing in the +Y-axis direction, the first image capturing unit 20 cannot capture the pattern of the line light projected on the side surface 133. Thus, depending on the shape of the object 130, a blind spot (e.g., side surface 133 facing in the +Y-axis direction) that cannot be captured by the first image capturing unit 20 may occur. The shape measuring device 400 includes the first light radiating unit 10, the first image capturing unit 20, the second light radiating unit 30, the second image capturing unit 40, and the measuring unit 50.

The second light radiating unit 30 radiates third line light L3 that is linear light and fourth line light L4 that is linear light. Each of the third line light L3 and the fourth line light L4 is light that spreads in the X-axis direction. The third line light L3 and the fourth line light L4 are projected on the surface of the object 130. The shape of image of each of the third line light L3 and the fourth line light L4 projected on the surface of the object 130 is a linear form extending in the X-axis direction.

The fourth line light L4 is radiated from a position away from the third line light L3 in the Y-axis direction, which is a scanning direction. The fourth line light L4 is parallel to the third line light L3 in the X-axis direction. It should be noted that the fourth line light L4 is not necessarily parallel to the third line light L3 in only the X-axis direction and has only to be parallel to the third line light L3 in predetermined one direction.

The second light radiating unit 30 is disposed on the +Y-axis side from the first light radiating unit 10. A radiation direction of the third line light L3 and a radiation direction of the fourth line light L4 are different from a radiation direction of the first line light L1 and a radiation direction of the second line light L2. The side surface 133 facing in the +Y-axis direction, which cannot be captured by the first image capturing unit 20, of the object 130, is irradiated with the third line light L3 and the fourth line light L4.

The second image capturing unit 40 includes a second field of view F2 that is different from the first field of view F1. A direction of the second field of view F2 is different from radiation directions of the third line light L3 and the fourth line light L4 radiated from the second light radiating unit 30. The second image capturing unit 40 is, for example, a camera including a CCD image sensor. The second image capturing unit 40 captures the object 130 passing through the third measurement region Z3. The third measurement region Z3 is a region where a third plane V3 through which the third line light L3 passes and the second field of view F2 intersect with each other. The third plane V3 is an imaginary X-Z plane. In an example shown in FIG. 9, a height H3 of the object 130 from the datum plane S is within the third measurement region 23 and the first measurement region Z1. It should be noted that the third line light L3 and the fourth line light L4 are sometimes not parallel to the X-Z plane depending on the angles of incidence, but the third line light L3 and the fourth line light L4 are radiated along the X-Z plane. For that reason, each of the third plane V3 and the fourth plane V4 through which the fourth line light L4 described later passes is referred to as an "imaginary X-Z plane."

In addition, the second image capturing unit 40 captures the object passing through the fourth measurement region Z4 that is different from the third measurement region Z3. The fourth measurement region Z4 is a region where the fourth plane V4 through which the fourth line light L4 passes and the second field of view F2 intersect with each other. The fourth plane V4 is an imaginary X-Z plane.

The fourth measurement region Z4 is disposed on the second light radiating unit 30 side (i.e., on the +Z-axis side) from the third measurement region Z3. The fourth measurement region Z4 is located next to the third measurement region Z3 in the Z-axis direction. In addition, the fourth measurement region Z4 does not overlap with the third measurement region Z3 in the Z-axis direction. It should be noted that a part of the fourth measurement region Z4 may overlap with the third measurement region Z3 so long as most of the fourth measurement region Z4 does not overlap with the third measurement region Z3. That is, the fourth measurement region 24 has only to include a region that does not overlap with the third measurement region Z3.

An angle of incidence made by the fourth line light L4 is different from an angle of incidence made by the third line light L3. This makes it possible to serve the fourth measurement region Z4 as a region that is different from the third measurement region 23. In the fourth embodiment, the fourth line light L4 is incident on the object 130 along a normal perpendicular to the datum plane S. Therefore, the angle of incidence made by the fourth line light L4 is zero degrees. In contrast to this, the angle of incidence made by the third line light L3 is larger than zero degrees. It should be noted that the angle of incidence made by the fourth line light L4 may be the same as the angle of incidence made by the third line light L3.

Also, it is possible to serve the fourth measurement region Z4 as a region that is different from the third measurement region Z3 by adjusting a position of the second image capturing unit 40 and an optical axis angle of the second image capturing unit 40. Also, the optical axis of the second image capturing unit 40 is located across from the optical axis of the first image capturing unit 20 with the center line C, which is perpendicular to the datum plane S, that passes through the center in the Y-axis direction of the object 130 in between. In other words, the second image capturing unit 40 is disposed across from the first image capturing unit 20 with the first light radiating unit 10 and the second light radiating unit 30 in between in the Y-axis direction.

The measuring unit 50 measures the shape of the object 130 on the basis of an image including an image of the line light obtained by the first image capturing unit 20 and an image including an image of the line light obtained by the second image capturing unit 40.

When the height H3 of the object 130 is within the first measurement region Z1 and the third measurement region 3, the measuring unit 50 measures the shape of the object 130 on the basis of a first image that is an image of a region 131a that is a part, which is irradiated with the line light L1, of the top surface 131 of the object 130 and a third image that is an image of a region 131b that is a part, which is irradiated with the third line light L3, of the top surface 131. Accordingly, the shape of the object 130 can be measured on the basis of the third image obtained by the second image capturing unit 40 for the region 131b, which is a blind spot from the first image capturing unit 20, of the object 130.

When the height H3 of the object 130 is within the second measurement region Z2 and the fourth measurement region Z4, the measuring unit 50 measures the shape of the object 130 on the basis of second images that are images of parts, which are irradiated with the second line light L2, of the object 130 and a fourth image that is an image of a part, which is irradiated with the fourth line light L4.

The image obtained by the first image capturing unit 20 and the image obtained by the second image capturing unit 40 are sometimes in common with each other. In this case, the measuring unit 50 calculates data indicating height information of the object 130 on the basis of both of the image obtained by the first image capturing unit 20 and the image obtained by the second image capturing unit 40. It should be noted that the measuring unit 50 may calculate the data described above on the basis of either the image obtained by the first image capturing unit 20 or the image obtained by the second image capturing unit 40.

Advantage of Fourth Embodiment

According to the fourth embodiment described above, the shape measuring device 400 includes the second light radiating unit 30 and the second image capturing unit 40. Accordingly, it is possible to measure the shape of the region of the object 130 that is a blind spot (specifically, side surface 133 facing in the +Y-axis direction) of the first image capturing unit 20, that is, an occlusion portion of the object 130.

DESCRIPTION OF REFERENCE CHARACTERS 10 first light radiating unit, 20, 220 first image capturing unit, 30 second light radiating unit, 40 second image capturing unit, 50 measuring unit, 100, 200, 300, 400 shape measuring device, 110, 120, 130 object, A1, A2, A3, A4, A21, A22 length, B10, B11, B20, B21, B22, B23 image, F1 first field of view, F2 second field of view, G1, G2 focal point, L1, L31 first line light, L2, L32 second line light, L3 third line light, L4 fourth line light, V1 first plane, V2 second plane, V3 third plane, V4 fourth plane, Z1, Z21 first measurement region, Z2, Z22 second measurement region.

What is claimed is:

1. A shape measuring device comprising:
    a first light radiating unit including at least one light source to radiate first line light and second line light, the first line light being linear light, the second line light being linear light;
    a first image capturing unit including a camera having a first field of view, to capture an object passing through a first measurement region, and to capture the object passing through a second measurement region different from the first measurement region, the first measurement region being a region where a first plane through which the first line light passes and the first field of view intersect with each other, the second measurement region being a region where a second plane through which the second line light passes and the first field of view intersect with each other, the second measurement region being located on the first light radiating unit side from the first measurement region; and
    a measuring unit including processing circuitry configured to measure a shape of the object on a basis of a first image that is an image of a part of the object passing through the first measurement region and second images that are images of parts of the object passing through the second measurement region, the part of the object passing through the first measurement region being irradiated with the first line light, the parts of the object passing through the second measurement region being irradiated with the second line light,
    wherein the processing circuitry is further configured to measure the shape of the object including a height of the object based on a determination of whether an image of a line light projected on the object is an image of the first line light or an image of the second line light.

2. The shape measuring device according to claim 1, wherein a second angle of incidence is equal to or larger than a first angle of incidence, the second angle of incidence being an angle of incidence made by the second line light incident on the object, the first angle of incidence being an angle of incidence made by the first line light incident on the object.

3. The shape measuring device according to claim 2, wherein the second angle of incidence is larger than the first angle of incidence.

4. The shape measuring device according to claim 2, wherein in a direction along a height of the object from a datum plane on which the object is placed, either a length of the first measurement region or a length of the second measurement region is equal to or shorter than the other.

5. The shape measuring device according to claim 4, wherein the length of the first measurement region is shorter than the length of the second measurement region.

6. The shape measuring device according to claim 1, wherein a focal point of the first line light is included in the first measurement region.

7. The shape measuring device according to claim 1, wherein a focal point of the second line light is included in the second measurement region.

8. The shape measuring device according to claim 1, further comprising:
- a second light radiating unit to radiate third line light and fourth line light, the third line light being linear light, the fourth line light being linear light; and
- a second image capturing unit having a second field of view different from the first field of view, to capture the object passing through a third measurement region, and to capture the object passing through a fourth measurement region different from the third measurement region, the third measurement region being a region where a third plane through which the third line light passes and the second field of view intersect with each other, the fourth measurement region being a region where a fourth plane through which the fourth line light passes and the second field of view intersect with each other, the fourth measurement region being located on the second light radiating unit side from the third measurement region,
- wherein the measuring unit measures the shape of the object on a basis of the first image, the second images, a third image, and a fourth image, the third image being an image a part, which being irradiated with the third line light, of the object passing through the third measurement region, the fourth image being an image a part, which being irradiated with the fourth line light, of the object passing through the fourth measurement region.

9. The shape measuring device according to claim 8, wherein a radiation direction of the third line light and a radiation direction of the fourth line light are different from a radiation direction of the first line light and a radiation direction of the second line light.

10. The shape measuring device according to claim 1, wherein an intensity of the first line light is different than an intensity of the second line light.

11. The shape measuring device according to claim 1, wherein a wavelength of the first line light is different than a wavelength of the second line light.

12. The shape measuring device according to claim 1, wherein:
- the first light radiating unit includes a first spot light source, a second spot light source, a collimating lens that collimates light emitted from the first and second spot light sources, and a cylindrical lens that converts a pattern of light collimated by the collimating lens to the first line light and the second line light.

13. A shape measuring device comprising:
- a first light radiating unit including at least one light source to radiate first line light and second line light, the first line light being linear light, the second line light being linear light;
- a first image capturing unit including a camera having a first field of view, to capture an object passing through a first measurement region, and to capture the object passing through a second measurement region different from the first measurement region, the first measurement region being a region where a first plane through which the first line light passes and the first field of view intersect with each other, the second measurement region being a region where a second plane through which the second line light passes and the first field of view intersect with each other, the second measurement region being located on the first light radiating unit side from the first measurement region;
- a measuring unit including processing circuitry configured to measure a shape of the object on a basis of a first image that is an image of a part of the object passing through the first measurement region and second images that are images of parts of the object passing through the second measurement region, the part of the object passing through the first measurement region being irradiated with the first line light, the parts of the object passing through the second measurement region being irradiated with the second line light;
- a second light radiating unit to radiate third line light and fourth line light, the third line light being linear light, the fourth line light being linear light; and
- a second image capturing unit having a second field of view different from the first field of view, to capture the object passing through a third measurement region, and to capture the object passing through a fourth measurement region different from the third measurement region, the third measurement region being a region where a third plane through which the third line light passes and the second field of view intersect with each other, the fourth measurement region being a region where a fourth plane through which the fourth line light passes and the second field of view intersect with each other, the fourth measurement region being located on the second light radiating unit side from the third measurement region,
- wherein the measuring unit measures the shape of the object on a basis of the first image, the second images, a third image, and a fourth image, the third image being an image a part, which being irradiated with the third line light, of the object passing through the third measurement region, the fourth image being an image a part, which being irradiated with the fourth line light, of the object passing through the fourth measurement region.

* * * * *